(12) United States Patent
Gibbs et al.

(10) Patent No.: US 9,121,484 B2
(45) Date of Patent: Sep. 1, 2015

(54) TORQUE CONVERTER WITH IMPELLER CLUTCH

(71) Applicant: Caterpillar Inc., Peoria, IL (US)

(72) Inventors: Jeremy A. Gibbs, Tremont, IL (US); Aurelian I. Furcoiu, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 26 days.

(21) Appl. No.: 13/908,694

(22) Filed: Jun. 3, 2013

(65) Prior Publication Data

US 2014/0353106 A1 Dec. 4, 2014

(51) Int. Cl.
*F16H 45/00* (2006.01)
*F16D 13/68* (2006.01)

(52) U.S. Cl.
CPC ............. *F16H 45/00* (2013.01); *F16D 13/683* (2013.01); *F16H 2045/002* (2013.01)

(58) Field of Classification Search
CPC ........................... F16H 2045/002; F16H 45/00
USPC ......... 192/3.21, 3.25, 3.26, 3.33, 70.19, 85.4, 192/85.43, 85.61
See application file for complete search history.

(56) References Cited

U.S. PATENT DOCUMENTS

| | | | | |
|---|---|---|---|---|
| 1,340,885 | A | * | 5/1920 | Fuller ........................ 192/70.19 |
| 3,384,209 | A | * | 5/1968 | Murphy ....................... 192/3.33 |
| 4,226,309 | A | | 10/1980 | Siliberschlag |
| 6,629,369 | B1 | * | 10/2003 | Korner et al. ................ 29/893.1 |
| 7,815,026 | B2 | | 10/2010 | Povirk et al. |
| 2004/0216971 | A1 | * | 11/2004 | Johann et al. ................ 192/3.26 |
| 2008/0271966 | A1 | * | 11/2008 | Simpson et al. ............. 192/3.33 |
| 2011/0118082 | A1 | * | 5/2011 | Tsuzuki et al. ............... 477/168 |

FOREIGN PATENT DOCUMENTS

GB      1490346      11/1977

* cited by examiner

*Primary Examiner* — Richard Lorence
(74) *Attorney, Agent, or Firm* — Tim Parker; Miller, Matthias & Hull LLP

(57) ABSTRACT

A torque converter includes an impeller, a turbine and a stator. The torque converter may also include an impeller clutch configured to releasably couple the impeller to a power source, the impeller clutch having a disc stack with a plurality of splined friction discs and a plurality of separator plates. The friction discs may be rotationally engaged with the impeller. Each of the separator plates has an ear extending radially outward from an outer diameter and an opening formed in the ear, the openings in the ears of the stator plates being circumferentially aligned to define a channel. A pin is received in the channel and in a recess defined by the rotating housing.

20 Claims, 5 Drawing Sheets

TORQUE CONVERTER WITH IMPELLER CLUTCH

TECHNICAL FIELD

The present disclosure relates generally to a torque converter and, more particularly, to a torque converter having a pinned impeller clutch.

BACKGROUND

A torque converter is a form of a hydrodynamic fluid coupling and may be used to transfer rotating power from a power source to another driven component. For example, a torque converter may provide a hydrodynamic fluid coupling between an internal combustion engine or electric motor and a transmission. The torque converter may include an impeller driven by the power source (e.g. internal combustion engine), a turbine operatively coupled to the driven component (e.g. transmission) and a stator positioned between the impeller and turbine to redirect fluid flowing from the turbine to the impeller. The torque converter may be capable of multiplying torque under conditions where the input rotational speed is significantly different from the output rotational speed.

An impeller clutch may be provided in the torque converter to allow for selective driving of the impeller by the power source. The impeller clutch may therefore be positioned between the power source and the impeller to operatively couple the two together when engaged, and alternatively uncouple the impeller from the power source when not engaged. In known impeller clutch designs a disc stack including a plurality of alternating friction discs and separator plates may be provided with a piston plate on one side. An actuating device is positioned adjacent the piston plate and opposite the disc stack to compress the disc stack when actuated. The friction discs of the disc stack include a splined inner diameter that engages the impeller or an adapter and the separator plates include a splined outer diameter that engages a rotating housing driven by the power source.

U.S. Pat. No. 7,815,026, issued Oct. 19, 2010, discloses a torque converter having an impeller, a turbine, a stator and an impeller clutch for alternately engaging and disengaging a drive connection between the impeller and a power source. Existing impeller clutch designs suffer from disadvantages and present opportunities for improvement. One disadvantage to known designs is that a splined interface at the outer diameter of the separator plates of the disc stack leaves little open space for cooling fluid and may impede fluid flow through the disc stack, resulting in elevated temperatures and reduced efficiency of the torque converter under some operating conditions.

The torque converter of the present disclosure includes an improved impeller clutch.

SUMMARY OF THE INVENTION

One aspect of the present disclosure is directed to an impeller clutch comprising a plurality of separator plates, each including a disc portion and a plurality of circumferentially spaced ears extending radially therefrom, each ear defining an opening; the separator plates being arranged such that the openings defined by the ears create a plurality of axially extending channels; and a pin positioned within one of the channels.

Another aspect of the present disclosure is directed to an impeller clutch for use in a torque converter including a driven rotating housing, an impeller selectively coupled to the rotating housing, a turbine axially spaced from and hydrodynamically connected to the impeller, and a stator positioned axially between the impeller and turbine. The impeller clutch includes a plurality of splined friction discs rotationally engaged with the impeller; a plurality of annular separator plates, each including a disc portion with an outer diameter and an ear extending outward from the outer diameter of the disc portion a height H, each ear defining an opening with the ears of the plurality of separator plates being circumferentially aligned to define a channel; and a pin received in the channel, the pin having a diameter P, wherein the ratio of the diameter P of the pins to the height H of the ears is between approximately 0.55 and 0.75.

Another aspect of the present disclosure is directed to a torque converter comprising: an impeller; a turbine hydrodynamically connected to the impeller and configured to drive a transmission input shaft; a stator positioned axially between the impeller and turbine and configured to redirect fluid flow to the impeller; and an impeller clutch configured to releasably couple the impeller to a rotating housing, the impeller clutch including a plurality of splined friction discs rotationally engaged with the impeller; a plurality of separator plates, each having a disc portion and an ear extending radially outward from an outer diameter of the disc portion, each ear defining an opening, the openings in the ears of the stator plates being circumferentially aligned to define an axial channel; and a pin received in said channel and in a recess defined by the rotating housing.

DETAILED DESCRIPTION

Figure 1:
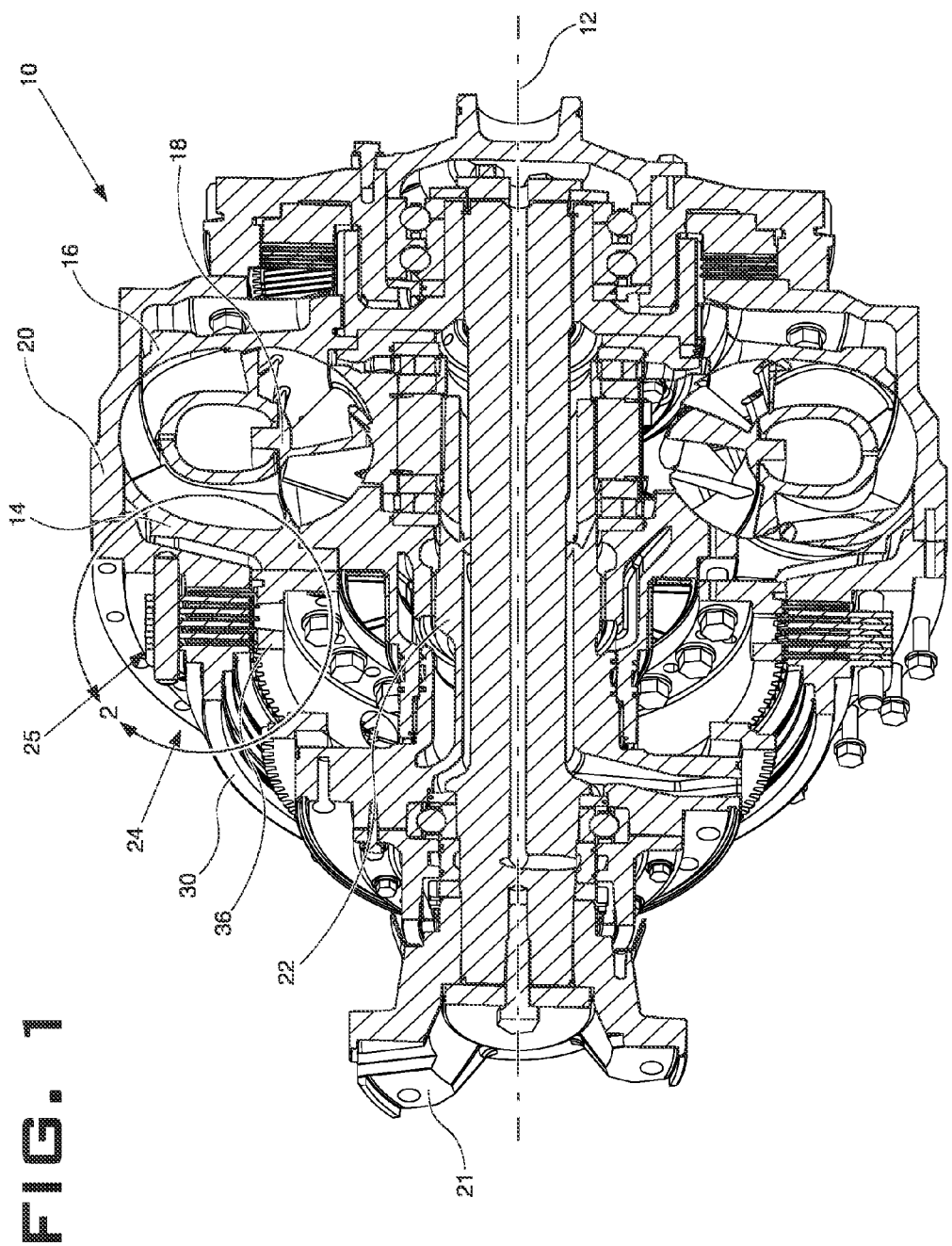
FIG. 1 is cross section view of a torque converter according to the concepts of the present disclosure.
Figure 2:
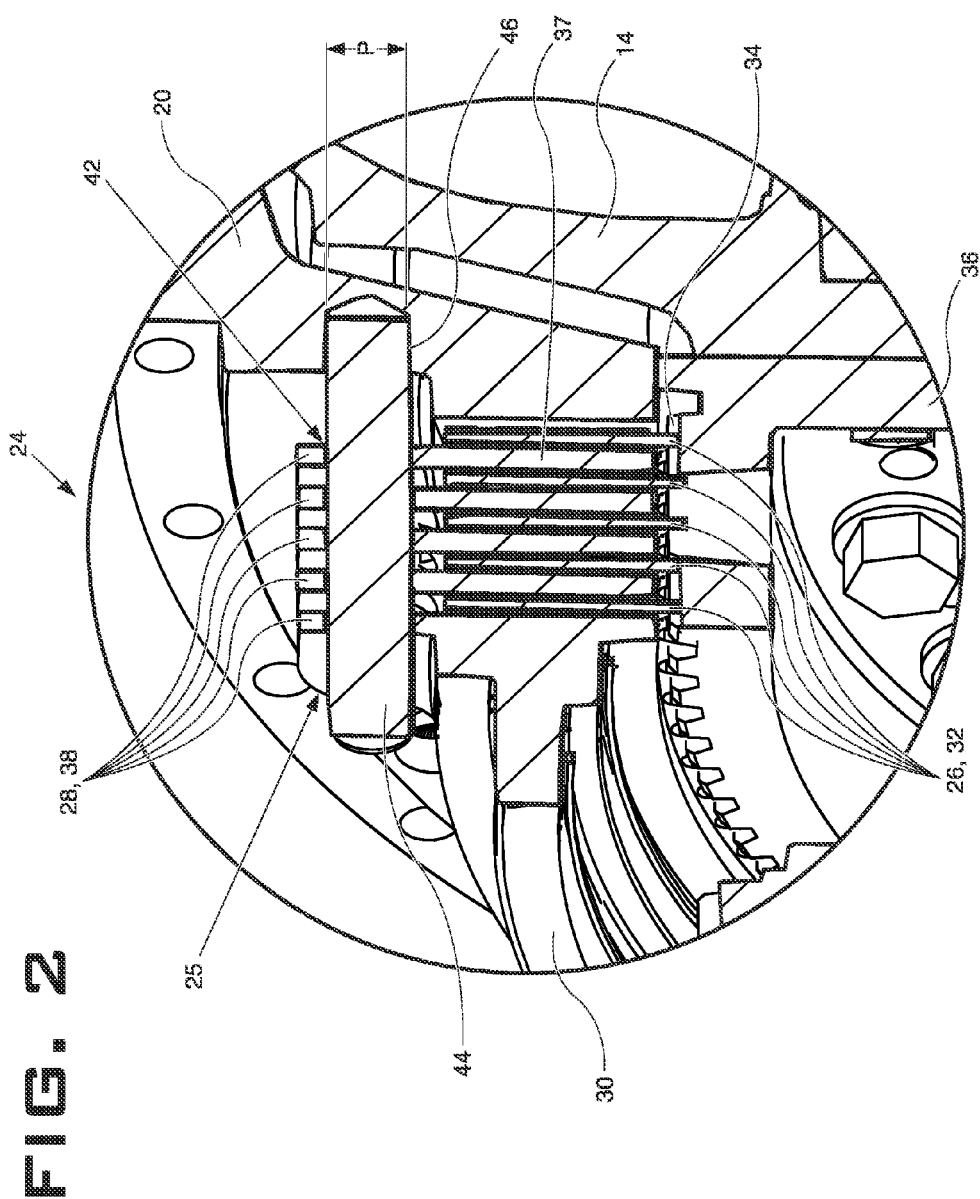
FIG. 2 is a fragmentary cross section view of the impeller clutch of the torque converter of FIG. 1.
Figure 3:
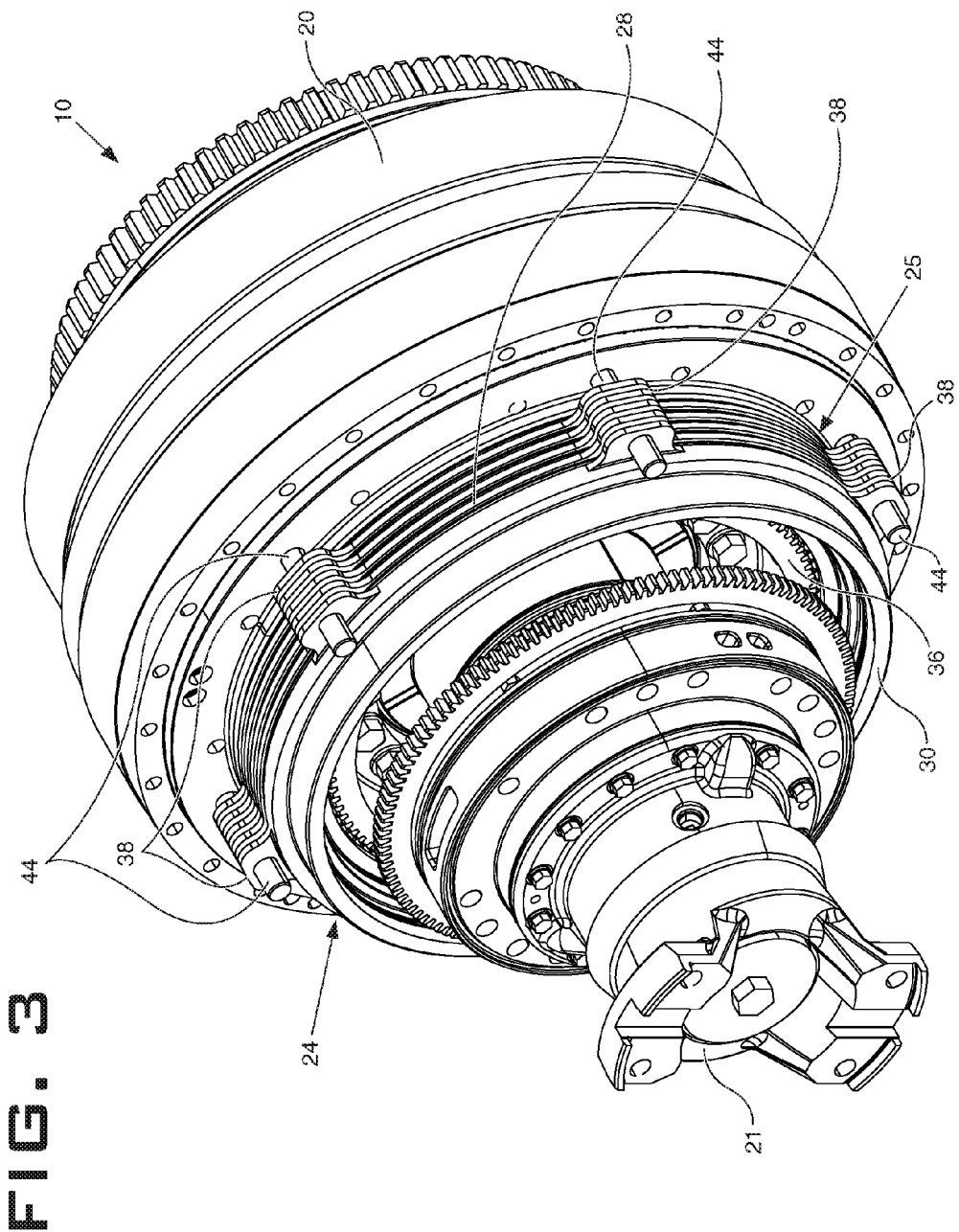
FIG. 3 is a perspective view of the impeller clutch of the torque converter of FIG. 1 with a portion of the housing removed.
Figure 4:
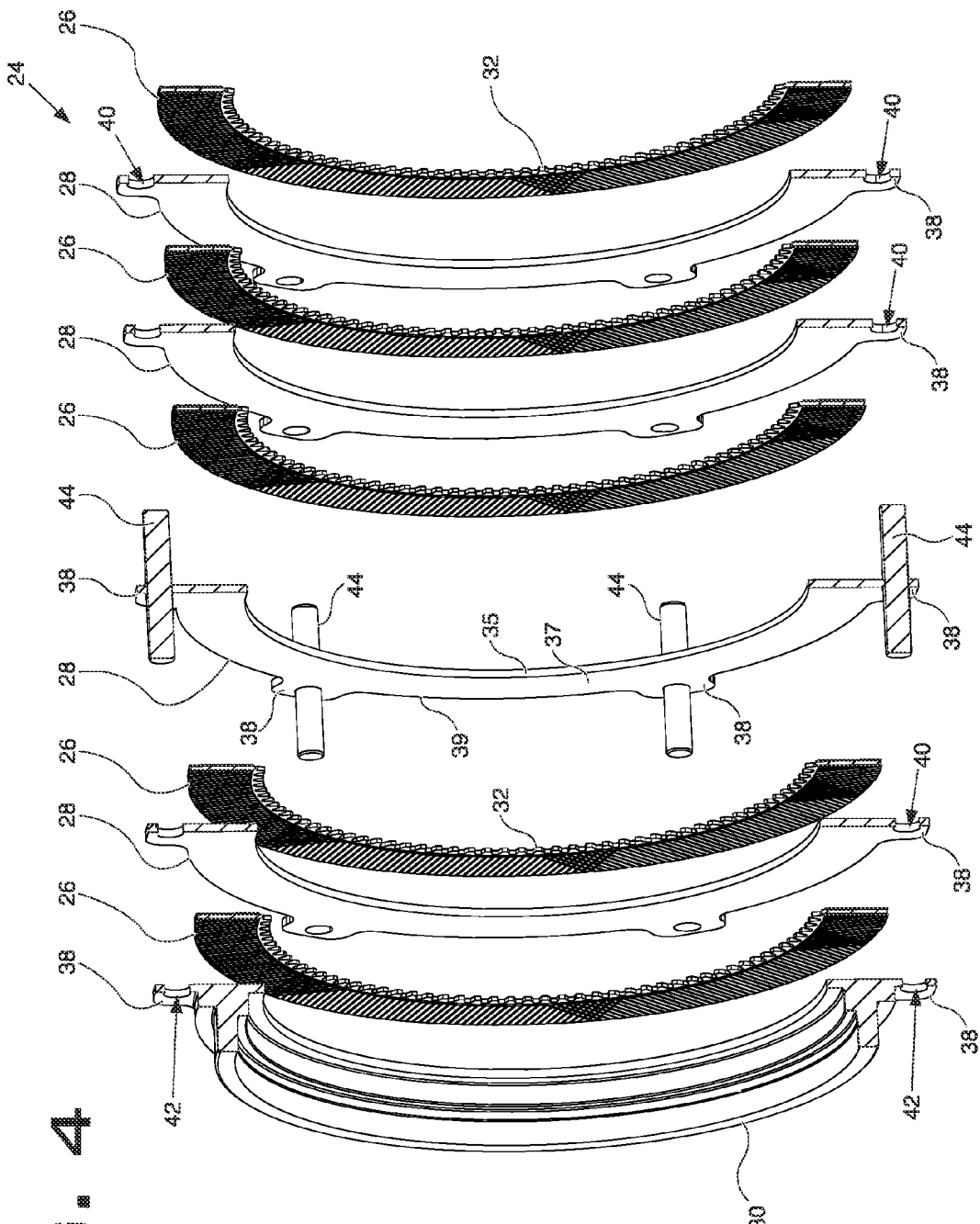
FIG. 4 is an exploded cross section view of the impeller clutch disc stack.

Referring now to FIG. 1, a torque converter is shown and is indicated generally by the numeral 10. The torque converter 10 includes a central axis of rotation 12 about which rotating components of the torque converter rotate. The torque converter includes a rotating impeller 14, a rotating turbine 16 and a stator 18 positioned axially between the impeller 14 and turbine 16. A toroidal fluid flow circuit is created by the impeller 14, turbine 16 and stator 18.

The impeller 14 may be operatively connected to a power source (not shown), such as, for example, an internal combustion engine or electric motor. A rotating housing 20 positioned around the impeller 14, turbine 16 and stator 18 may be coupled to both the power source and impeller 14 to transfer rotational forces to the impeller 14. The turbine 16 may be operatively coupled to an output shaft 21, which may also be referred to as a transmission input shaft. The turbine 16 may be hydrodynamically coupled to the impeller 14 so that rotation of the impeller 14 drives the turbine 16 and output shaft 21. The stator 18 may be mounted on a stationary support shaft 22 and may be configured to rotate about the support shaft 22 in a direction of rotation of the impeller 14. The stator 18 may be restricted against rotation about the support shaft 22 in a direction opposite the direction of rotation of the impeller 14.

An impeller clutch 24 may be located within the rotating housing 20 for selective coupling of the rotating housing 20 and impeller 14. The impeller clutch 24 may include a disc stack 25 comprising a plurality of alternating friction discs 26 and separator plates 28 that are coaxial with the impeller 14, turbine 16, stator 18 and rotating housing 20. A piston plate 30 may be positioned on an axial end of the disc stack 25. One or more actuators (not shown) such as, for example, hydraulically actuated pistons, may be configured to engage the piston plate 30 to compress the disc stack 25.

Each of the friction discs 26 may be generally annular in shape with a splined inner diameter 32 engaged with a splined outer surface 34 of an impeller adapter 36 that is coupled to the impeller 14. It is also contemplated that the splined outer surface 34 may be formed integrally on impeller 14. The friction discs 26 may be free to move axially along the impeller adapter 36. Each of the friction discs 26 may be made from, or include coatings of, a material having a high coefficient of friction.

The separator plates 28 may also be generally annular in shape and may each have a disc portion 37 with a generally smooth, or not splined, inner diameter 35 that is greater than the splined outer diameter 34 of the impeller adapter 36. The greater size of the inner diameter 35 allows the separator plates 28 to rotate freely about the impeller adapter 36 independent of the impeller 14. In an exemplary embodiment, the disc portion 37 of the separator plates 28 may each have an outer diameter 39 with a radius R equal to approximately 270 mm (10.6 in).

Figure 5:
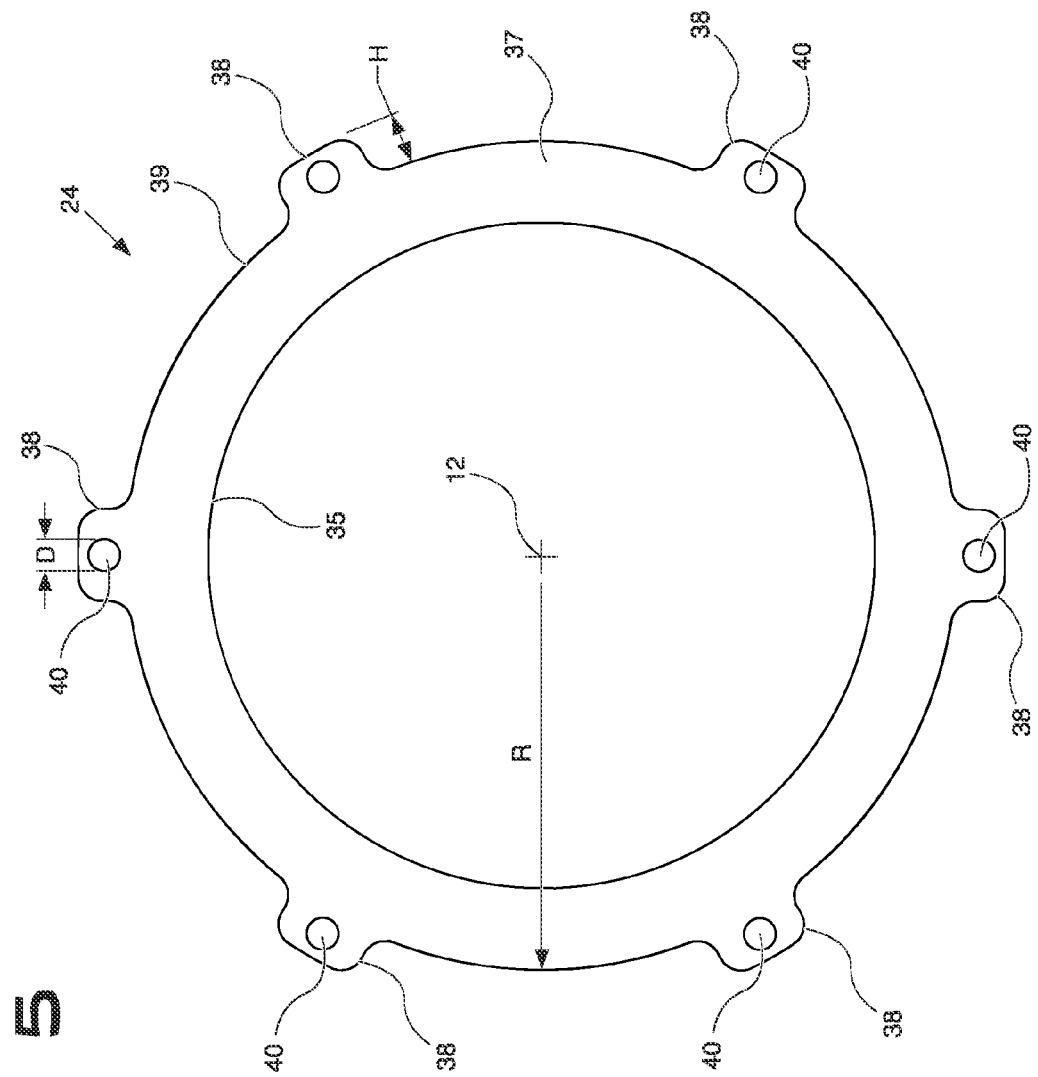
FIG. 5 is a top view of a separator plates according to the concepts of the present disclosure.

Each separator plate 28 includes at least one ear 38 extending radially outward a height H from the outer diameter 39 of the disc portion 37. The height H of the ear 38 may, for example, be approximately 32 mm (1.24 in). In a particular embodiment, as shown in FIG. 5, each separator plate 28 may include a total of six ears 38 extending radially outward from the outer diameter 39. The ears 38 may be circumferentially spaced about the outer diameter 39 approximately 60° from one another. However, it is also contemplated that more or less ears 38 may be provided on each separator plate 28, and the number and spacing of ears 38 may be dependent at least partially upon the size of the separator plates 28 and the forces experienced by the separator plates in use. The ratio of the height H of the ears 38 to the radius R of the separator plates may be between approximately 0.08 and 0.15.

Each ear 38 may define an opening 40 therethrough, the opening 40 having a diameter D. The ratio of the diameter D of the opening to the height H of the ear may be between approximately 0.55 and 0.75. The ears 38 and openings 40 of the plurality of separator plates 28 may be circumferentially aligned when positioned within torque converter 10 to create one or more axially extending channels 42. Each channel 42 may extend through openings 40 in all of the circumferentially aligned separator plates 28. A retaining pin 44 may be received within each of the channels 42 and within a recess 46 in the rotating housing 20. The retaining pins 44 may have a diameter P approximately equal to, but less than the diameter D of the openings 40. Thus, the ratio of the diameter P of the retaining pins 44 to the height H of the ears may also be between approximately 0.55 and 0.75. The separator plates 28 are rotationally coupled to the rotating housing 20 by the pins 44, but are free to slide axially along the pins when compressed by the piston plate 30.

Piston plate 30 may include one or more openings 40 defined by ears 38 similar or identical to those of separator plates 28. The openings 40 of ears 38 extending from piston plate 30 may, together with the openings 40 in the ears 38 of the separator plates 28, form a part of the axially extending channels 42 that receive retaining pins 44. In this way the piston plate 30 is moveable axially along the pins 44 to compress or release the disc stack 25.

INDUSTRIAL APPLICABILITY

The impeller clutch of the present disclosure may be applicable to any known torque converter. The impeller clutch 24 and disc stack 25 act to selectively connect the impeller 14 with the rotating housing 20 and the associated power source (e.g. internal combustion engine). Rotation of the impeller 14 drives rotation of the turbine 16 through a hydrodynamic coupling, and rotation of the turbine 16 drives rotation of the output shaft or transmission input shaft 21. When the disc stack 25 is unengaged by the piston plate 30, the separator plates 28 rotate independently of the friction discs 26 so that rotation of the rotating housing 20 is not transferred to the impeller 14.

The friction discs 26 of the impeller clutch 24 are rotationally coupled to the impeller 14 or impeller adapter 36 through the splined inner diameter 32 and splined outer surface 34. The separator plates 28 of the disc stack 25 are rotationally coupled, via ears 38, openings 40 and pins 44, to the rotating housing 20. When engaged or actuated, the piston plate 30 compresses the alternating friction discs 26 and separator plates 28 to rotationally couple the rotating housing 20 to the impeller 14. Under compressive forces the high coefficient of friction provided by the friction discs 26 couples the separator plates 28 and friction discs 26 together. When the piston plate 30 is released, then the compressive force is removed and the separator plates 28 and friction discs 26 move axially to allow for free rotation of the separator plates.

The inclusion of ears 38 at the outer diameter of the separator plates 28, as opposed to a splined outer diameter as contemplated by prior art impeller clutches, may provide improved flow of cooling fluid through the disc stack 25. The spaced ears 38 allow for open space between the ears and at the outer radial edge of the disc stack 25, and this open space may encourage increased cooling fluid flow radially outward through the disc stack 25. The disc stack 25 with ears 38 and pins 44 also provides sufficient strength to resist forces acting upon the separator plates 28 in operation. The size and spacing of the ears 38, openings 40 and pins 44 may affect both fluid flow through the disc stack 25 as well as the strength of the assembly.

Using known CFD modeling techniques, the total flow rate of cooling fluid across the friction discs of the disclosed pinned impeller clutch was measured and compared to a conventional splined impeller clutch. The pinned impeller clutch used in the computer modeling was consistent with the impeller clutch disclosed herein, and included six circumferentially spaced ears with openings that received pins as shown in FIGS. 1-5. The splined impeller clutch (Splined IC) used for comparison purposes was typical of prior art designs and included a plurality of separator plates with a splined outer diameter that engaged a splined inner diameter of a rotating housing.

The increase in fluid flow rate across the friction discs for the pinned impeller clutch 24 of the present disclosure, as compared to a conventional impeller clutch with splined separator plates, and as measured across a number of impeller speeds from 500 to 1550 rpm, ranged from approximately 30% to approximately 150%. Additionally, the drag torque produced by the separator plates 28 when the impeller clutch 24 is disengaged may be significantly reduced using the pinned impeller clutch of the present disclosure. CFD modeling shows a decrease of approximately 35-40% in drag torque as compared to conventional splined separator discs, as described above.

It will be apparent to those skilled in the art that various modifications and variations can be made to the impeller clutch and torque converter of the present disclosure without departing from the scope of the disclosure. Other embodiments will be apparent to those skilled in the art from consideration of the specification. It is intended that the specification and examples be considered as exemplary only, with a true scope of the disclosure being indicated by the following claims and their equivalent.

What is claimed is:

1. An impeller clutch for an impeller disposed within a rotating housing, the impeller clutch comprising:
    a plurality of separator plates, each including a disc portion and a plurality of circumferentially spaced ears extending radially therefrom, each ear defining an opening;
    the separator plates being rotatable relative to the impeller and arranged such that the openings defined by the ears create a plurality of axially extending channels; and
    a pin positioned within one of the channels configured to couple the separator plates to the rotating housing.

2. The impeller clutch of claim 1, wherein the rotating housing further surrounds a turbine and a stator.

3. The impeller clutch of claim 2, wherein the impeller is hydrodynamically connected to the turbine, the turbine being rotationally coupled to a transmission input shaft.

4. The impeller clutch of claim 1, wherein the separator plates each include six circumferentially spaced ears extending radially from the disc portion, each ear defining an opening.

5. The impeller clutch of claim 1, wherein the disc portion of each separator plate is annular in shape with the disc portion having an outer diameter with a radius R, and each ear extending radially outward from the outer diameter a height H, the ratio of the height H to the radius R being between approximately 0.08 and 0.15.

6. The impeller clutch of claim 5, wherein the opening in each of the ears has a diameter D, the ratio of the diameter D of the openings to the height H of the ears being between approximately 0.55 and 0.75.

7. The impeller clutch of claim 5, further comprising a plurality of pins, wherein each of the plurality of pins has a diameter P, the ratio of the diameter P of the pins to the height H of the ears being between approximately 0.55 and 0.75.

8. The impeller clutch of claim 1, further comprising:
    friction discs having a splined internal diameter, the friction discs positioned between adjacent separator plates.

9. The impeller clutch of claim 8, wherein the friction discs are rotationally engaged with the impeller.

10. An impeller clutch for use in a torque converter including a driven rotating housing, an impeller selectively coupled to the rotating housing, a turbine axially spaced from and hydrodynamically connected to the impeller, and a stator positioned axially between the impeller and turbine, the impeller clutch comprising:
    a plurality of splined friction discs rotationally engaged with the impeller;
    a plurality of annular separator plates rotatable relative to the impeller, each including a disc portion with an outer diameter and an ear extending outward from the outer diameter of the disc portion a height H, each ear defining an opening with the ears of the plurality of separator plates being circumferentially aligned to define a channel; and
    a pin received in the channel and configured to couple the separator plates to the rotating housing, the pin having a diameter P, wherein the ratio of the diameter P of the pins to the height H of the ears is between approximately 0.55 and 0.75.

11. The impeller clutch of claim 10, wherein each of the separator plates includes a plurality of ears extending outward from the outer diameter of the disc portion and equally spaced about the circumference of the disc portion, said ears being circumferentially aligned to form a plurality of axially extending channels.

12. The impeller clutch of claim 11, wherein a plurality of pins are provided, each of the plurality of pins received in one of said plurality of channels.

13. The impeller clutch of claim 10, wherein each of the separator plates includes six ears extending radially outward from the outer diameter of the disc portion and circumferentially spaced approximately 60° from one another.

14. The impeller clutch of claim 13, wherein each ear extends radially outward from the outer diameter of the disc portion a height H, the ratio of the height H to the radius R being between approximately 0.08 and 0.15.

15. The impeller clutch of claim 14, wherein the openings in each of the ears have a diameter D, the ratio of the diameter D of the openings to the height H of the ears being between approximately 0.55 and 0.75.

16. A torque converter comprising:
    an impeller;
    a turbine hydrodynamically connected to the impeller and configured to drive a transmission input shaft;
    a stator positioned axially between the impeller and turbine and configured to redirect fluid flow to the impeller; and
    an impeller clutch configured to releasably couple the impeller to a rotating housing, the impeller clutch comprising:
    a plurality of splined friction discs rotationally engaged with the impeller;
    a plurality of separator plates rotatable relative to the impeller, each having a disc portion and an ear extending radially outward from an outer diameter of the disc portion, each ear defining an opening, the openings in the ears of the stator plates being circumferentially aligned to define an axial channel; and
    a pin received in said channel and in a recess defined by the rotating housing.

17. The torque converter of claim 16, wherein the friction discs have a splined internal diameter that is rotationally coupled to a splined outer diameter of an impeller adapter.

18. The impeller clutch of claim 16, wherein each of the separator plates includes a plurality of ears extending radially outward from the outer diameter of the disc portion and circumferentially spaced around the outer diameter.

19. The impeller clutch of claim 18, wherein each disc portion has an outer diameter with a radius R and each ear extends radially outward from the disc portion a height H, the ratio of the height H to the radius R being between approximately 0.08 and 0.15.

20. The impeller clutch of claim 18, wherein each ear extends radially outward from the outer diameter of the disc portion a height H, the openings in each of the ears having a diameter D, and the ratio of the diameter D of the openings to the height H of the ears being between approximately 0.55 and 0.75.

* * * * *